(12) United States Patent
Inoue

(10) Patent No.: US 9,272,336 B2
(45) Date of Patent: Mar. 1, 2016

(54) CUTTING INSERT, CUTTING TOOL, AND METHOD OF MANUFACTURING MACHINED PRODUCT USING THEM

(75) Inventor: Yoshihiro Inoue, Omihachiman (JP)

(73) Assignee: Kyocera Corporation, Kyoto (JP)

( * ) Notice: Subject to any disclaimer, the term of this patent is extended or adjusted under 35 U.S.C. 154(b) by 323 days.

(21) Appl. No.: 13/876,671

(22) PCT Filed: Sep. 28, 2011

(86) PCT No.: PCT/JP2011/072181
§ 371 (c)(1),
(2), (4) Date: Mar. 28, 2013

(87) PCT Pub. No.: WO2012/043629
PCT Pub. Date: Apr. 5, 2012

(65) Prior Publication Data
US 2013/0192431 A1    Aug. 1, 2013

(30) Foreign Application Priority Data

Sep. 29, 2010 (JP) .................................. 2010-218510
Dec. 28, 2010 (JP) .................................. 2010-291754

(51) Int. Cl.
*B23B 27/04* (2006.01)
*B23B 27/22* (2006.01)
(Continued)

(52) U.S. Cl.
CPC .............. *B23B 27/1611* (2013.01); *B23B 1/00* (2013.01); *B23B 27/045* (2013.01); *B23B 29/043* (2013.01); *B23B 2200/081* (2013.01); *B23B 2220/126* (2013.01); *Y10T 82/10* (2015.01); *Y10T 407/2268* (2015.01);
(Continued)

(58) Field of Classification Search
CPC ...... B23B 27/045; B23B 27/22; B23B 27/04; Y10T 407/23; Y10T 407/235; Y10T 407/24; Y10T 407/245; Y10T 407/25
USPC .................................. 407/113–117; 82/1.11
See application file for complete search history.

(56) References Cited

U.S. PATENT DOCUMENTS 5,137,396 A     8/1992  Durschinger
5,676,495 A  *  10/1997  Katbi et al. ................... 407/114
(Continued)

FOREIGN PATENT DOCUMENTS

CN         1867416      11/2006
CN        101096055      1/2008
(Continued)

*Primary Examiner* — Sunil K Singh
*Assistant Examiner* — Nicole N Ramos
(74) *Attorney, Agent, or Firm* — Volpe and Koenig, P.C.

(57) ABSTRACT

A cutting insert according to an embodiment of the present invention includes an upper surface, a side surface, and a first cutting edge located at an intersection of the upper surface and the side surface. The upper surface includes a pair of raised parts located opposite to each other with a perpendicular bisector of the first cutting edge interposed therebetween. A top of each of the pair of raised parts includes at least two protrusions oriented toward a direction along the perpendicular bisector in a top view. Each of the at least two protrusions includes a first protrusion located on a side closest to the perpendicular bisector, and a second protrusion which is located on a side further away from the perpendicular bisector than the first protrusion, and is located at a higher position than the first protrusion. A cutting tool including the cutting insert, and a method of manufacturing a machined product by using the cutting tool are also provided.

13 Claims, 12 Drawing Sheets

(51) Int. Cl.
 *B23B 27/16* (2006.01)
 *B23B 29/04* (2006.01)
 *B23B 1/00* (2006.01)

(52) U.S. Cl.
 CPC .......... *Y10T 407/23* (2015.01); *Y10T 407/235* (2015.01); *Y10T 407/24* (2015.01); *Y10T 407/245* (2015.01); *Y10T 407/25* (2015.01)

(56) References Cited

U.S. PATENT DOCUMENTS

| | | | |
|---|---|---|---|
| 5,827,017 | A | 10/1998 | Tagstrom et al. |
| 5,853,267 | A | 12/1998 | Satran et al. |
| 5,975,812 | A * | 11/1999 | Friedman ................. 407/114 |
| 6,692,199 | B2 * | 2/2004 | Andersson et al. ......... 407/116 |
| 6,742,971 | B2 * | 6/2004 | Tong ............................ 407/117 |
| 8,784,014 | B2 * | 7/2014 | Onodera .................... 407/114 |

| | | |
|---|---|---|
| 2002/0197119 A1 | 12/2002 | Kinukawa |
| 2006/0269367 A1 | 11/2006 | Havrda |
| 2008/0003068 A1 | 1/2008 | Nagaya et al. |
| 2015/0056029 A1 | 2/2015 | Shimamoto et al. |

FOREIGN PATENT DOCUMENTS

| | | |
|---|---|---|
| DE | 3819415 | 12/1989 |
| JP | 6253902 | 4/1987 |
| JP | 08-168902 | 7/1996 |
| JP | 09-174308 | 7/1997 |
| JP | 09-262706 | 10/1997 |
| JP | 3046268 U | 12/1997 |
| JP | 2005517543 | 6/2005 |
| JP | 2010-099815 | 5/2010 |
| JP | 2010099816 | 5/2010 |
| WO | WO 98/07541 | 2/1998 |
| WO | 03070419 | 8/2003 |

* cited by examiner

CUTTING INSERT, CUTTING TOOL, AND METHOD OF MANUFACTURING MACHINED PRODUCT USING THEM

TECHNICAL FIELD

The present invention relates to a cutting insert, a cutting tool, and a method of manufacturing a machined product using them.

BACKGROUND ART

A structure that prevents chips from contacting a machined surface of a workpiece and damaging the machined surface is being considered for cutting inserts, particularly, cutting inserts for a cut-off process and a grooving process. Japanese Unexamined Patent Publication No. 2010-99815 discloses a cutting insert in which a cutting edge part and a square-shaped rake surface oriented in a thickness direction orthogonal to a longitudinal direction and a width direction of a shank-like insert body are formed at an end part of the insert body in the longitudinal direction thereof, and band-like helical surfaces extending along the longitudinal direction are respectively formed at both end parts in a width direction of the rake surface. The chips can be sufficiently rounded and easily divided by these two helical surfaces. This allows for a smooth and sure chip removal, and also prevents the chips from contacting the machined surface and damaging the machined surface.

However, for example, when the foregoing cutting insert is used for a face grooving process for forming an annular groove on an end surface of a workpiece, a chip discharge direction is apt to shift laterally because a cutting speed on a right end side of a cutting edge and a cutting speed on a left end side of the cutting edge are different from each other. Further, due to the influence of the cutting speed difference between the right end side and the left end side of the cutting edge, a curl diameter of chips generated on the right end side and a curl diameter of chips generated on the left end side are different from each other. Therefore, the chips are discharged spirally, and consequently there is a risk of deterioration of chip discharge performance.

SUMMARY OF THE INVENTION

An object of the present invention is to provide a cutting insert and a cutting tool which are suitable for the grooving process, particularly the face grooving process, and a method of manufacturing a machined product using the cutting insert and the cutting tool.

A cutting insert according to an embodiment of the present invention includes an upper surface, a side surface, and a first cutting edge located at an intersection of the upper surface and the side surface. The upper surface includes a pair of raised parts located opposite to each other with a perpendicular bisector of the first cutting edge interposed therebetween. A top of each of the pair of raised parts includes at least two protrusions oriented toward a direction along the perpendicular bisector in a top view. Each of the at least two protrusions includes a first protrusion located on a side closest to the perpendicular bisector, and a second protrusion which is located on a side further away from the perpendicular bisector than the first protrusion, and is located at a higher position than the first protrusion.

A cutting tool according to an embodiment of the present invention includes the cutting insert of the foregoing embodiment, and a holder configured to attach the cutting insert to a front end part of the holder.

A method of manufacturing a machined product according to an embodiment of the present invention includes: rotating a workpiece; allowing the workpiece being rotated and the first cutting edge of the cutting tool of the foregoing embodiment to be contacted with each other; and separating the cutting tool and the workpiece from each other.

According to the cutting insert of the embodiment of the present invention, the top of each of the pair of raised parts includes at least two protrusions oriented toward the direction along the perpendicular bisector. Each of the at least two protrusions includes the first protrusion located on the side closest to the perpendicular bisector, and the second protrusion which is located on the side further away from the perpendicular bisector than the first protrusion, and is located at the higher position than the first protrusion. Therefore, for example, during the face grooving process, chips can be deformed and hardened by the first protrusion, and a lateral shift in a chip discharge direction can be reduced by the second protrusion. Consequently, the chip discharge direction can be stabilized to improve chip discharge performance.

PREFERRED EMBODIMENTS FOR CARRYING OUT THE INVENTION

<Cutting Insert>

A cutting insert (hereinafter referred to as an "insert" in some cases) according to an embodiment of the present invention is described in details below with reference to FIGS. 1 to 11. The insert of the present invention is usable for all of the internal grooving process, the external grooving process, a cut-off process and a face grooving process. In the following description, the case of using the insert of the present invention for the face grooving process is exemplified unless otherwise noted.

First Embodiment

A first embodiment of the insert according to the present embodiment is described in details below with reference to FIGS. 1 to 7.

As shown in FIG. 1, the insert 1 of the present embodiment has a prism-like shape, and includes cutting sections I and I located at both ends thereof, and a clamp section II which is located between the cutting sections I and I, and has a clamp surface 28 configured to be contacted with a holder 11 (described later) when the insert is fixed to the holder 11. That is, the cutting sections I are provided in a pair on both ends of the clamp section II. In the present embodiment, a mark M is attached to either one of the pair of the cutting sections I and I in order to discriminate the cutting sections I, as shown in FIG. 1.

Some examples of the material of the insert 1 are cemented carbide and cermet. Some examples of the composition of the cemented carbide are WC—Co produced by adding powder of cobalt (Co) to tungsten carbide (WC), followed by sintering, WC—TiC—Co obtained by adding titanium carbide (TiC) to WC—Co, and WC—TiC—TaC—Co obtained by adding tantalum carbide (TaC) to WC—TiC—Co. The cermet is a sintered composite material obtained by complexing metal with ceramic ingredients, and specific examples thereof are titanium compounds composed mainly of titanium carbide (TiC) and titanium nitride (TiN).

The surface of the insert 1 may be coated with a coating film by using chemical vapor deposition (CVD) method or physical vapor deposition (PVD) method. Some examples of the coating film composition are titanium carbide (TiC), titanium nitride (TiN), titanium carbon nitride (TiCN) and alumina ($Al_2O_3$).

Figure 1A:
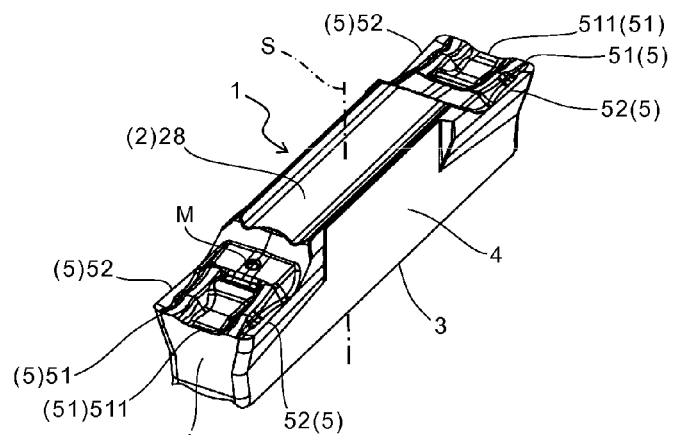
FIG. 1(a) is a perspective view showing a cutting insert according to a first embodiment of the present invention.
Figure 1B:
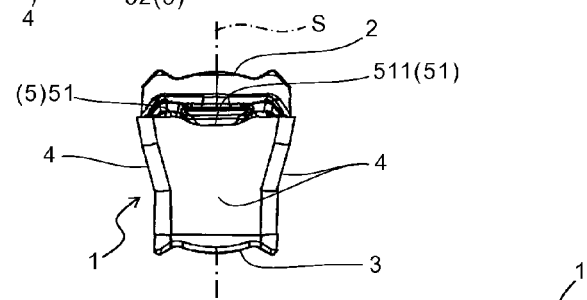
FIG. 1(b) is a front view thereof.
Figure 1C:
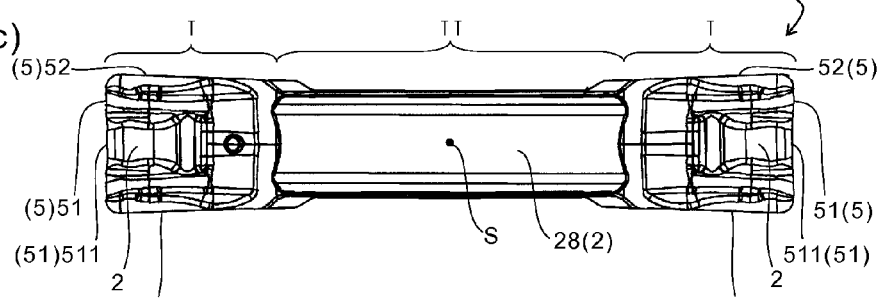
FIG. 1(c) is a plan view (top view) thereof.
Figure 1D:
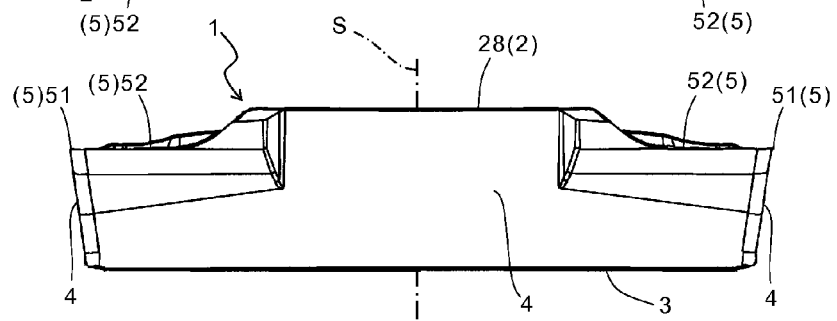
FIG. 1(d) is a side view thereof.
Figure 2:
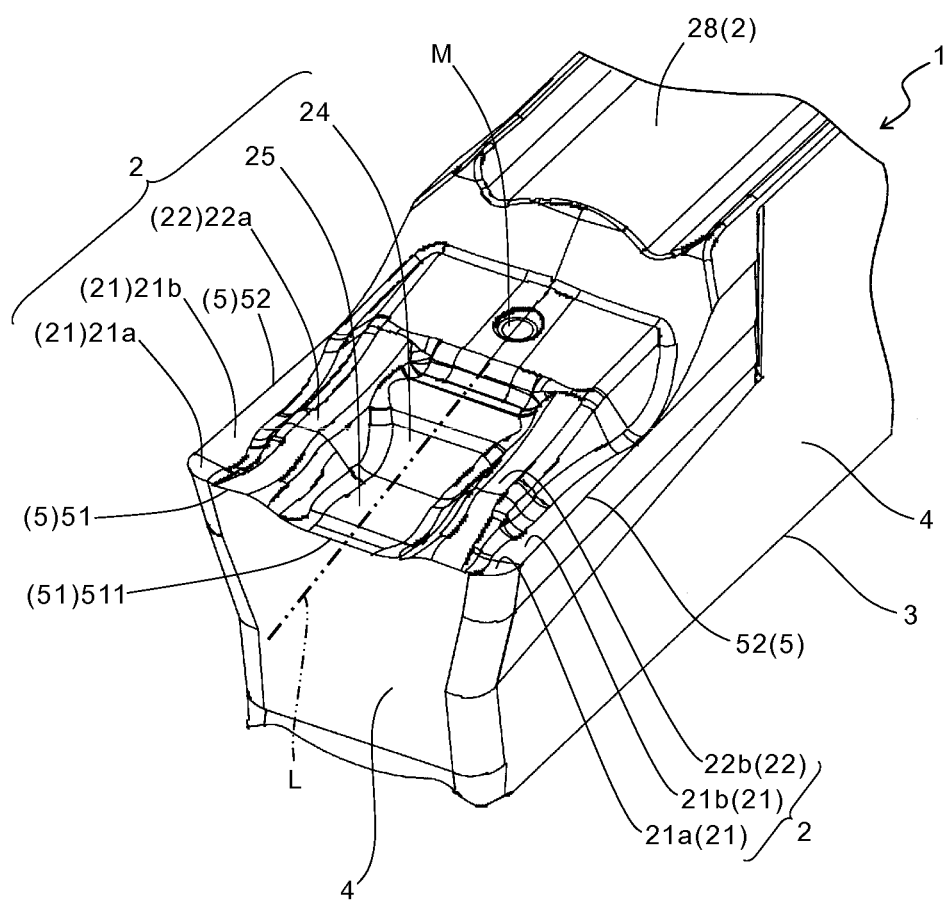
FIG. 2 is a perspective view showing, in partially enlarged scale, a part of a cutting section I and a part of a clamp section II of the cutting insert shown in FIG. 1.
Figure 3:
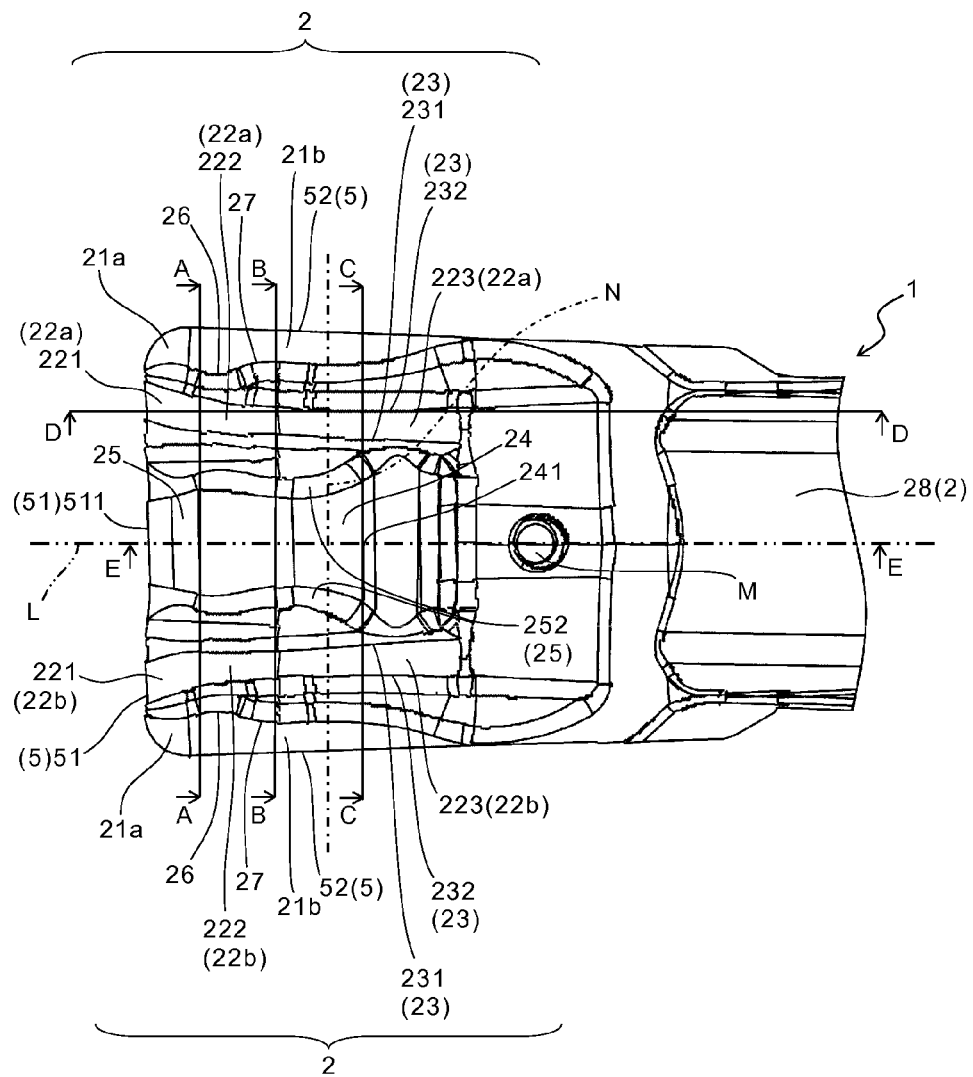
FIG. 3 is a plan view (top view) showing, in partially enlarged scale, a part of the cutting section and a part of the clamp section of the cutting insert shown in FIG. 1.

As shown in FIG. 2, each of the cutting sections I includes an upper surface 2, a lower surface 3, and a side surface 4 connected to each of the upper surface 2 and the lower surface 3. The upper surface 2 functions partially as a rake surface. The lower surface 3 functions partially as a mounting surface configured to be mounted on the holder 11. The side surface 4 functions at least partially as a flank surface. As shown in FIG. 3, the cutting section I has a polygonal shape in a top view, and in the present embodiment, it has a rectangular shape having two long sides and two short sides in a top view. Hereinafter, the phrase "top view" denotes a state that the insert 1 is viewed from the side of the upper surface 2 unless otherwise noted.

A length in a longitudinal direction of the insert 1 is preferably 18 to 22 mm, and a length in a width direction thereof perpendicular to the longitudinal direction is preferably 2 to 6 mm in a top view. The length in the width direction of the insert 1 is decreased as going toward the clamp section II in order to prevent the insert 1 from interfering with an inner wall surface of a groove machined in a workpiece during a cutting process. A height from the lower surface 3 to the upper surface 2 in the insert 1 is preferably, for example, 3.4 to 4.6 mm. Without being limited to these dimensions, they can be changed suitably to produce an operation advantage.

Cutting edges 5 are respectively disposed at an intersection of the upper surface 2 and the side surface 4. The cutting edges 5 are disposed, for example, along intersections in the longitudinal direction and width direction of the cutting sections I. In the present embodiment, as shown in FIG. 2, a first cutting edge 51 is disposed along the intersection in the width direction of the cutting sections I, and a second cutting edge 52 is disposed along the intersection in the longitudinal direction of the cutting sections I. Thus, the insert 1 includes not only the first cutting edge 51 but also the second cutting edge 52, thereby allowing the insert 1 to be used for a traversing process using the second cutting edge 52, such as a process for increasing a groove width, and a process for finishing a groove bottom surface. In the present embodiment, a pair of second cutting edges 52 are disposed on both end parts of the first cutting edge 51, and are respectively arranged to intersect the first cutting edge 51 and oppose to each other with the first cutting edge 51 interposed therebetween.

The cutting edges 5 may have, for example, a straight-like line or an arc-like shape, without being limited thereto. In the present embodiment, from the viewpoints of facilitating deformation of chips in the width direction thereof and preventing damage to the machined surface, the first cutting edge 51 includes a concave part 511 which has a concave-like shape, and is inclined and located at a lower position as going toward a middle part of the first cutting edge 51 in a side view. Hereinafter, the phrase "side view" denotes a state that the insert 1 is viewed from the side of the side surface 4 unless otherwise noted.

The cutting edge 5 may also include a land. The term "land" denotes a narrow band-like surface with a certain width which is disposed closer to the upper surface 2 and along the cutting edge 5. The land is disposed for the purpose of reducing the fracture of the cutting edges 5.

The upper surface 2 includes a rake surface 21 located inside the cutting edges 5. The rake surface 21 is the surface that the chips generated by the cutting edges 5 graze when they are discharged. In the present embodiment, as shown in FIG. 3, the rake surface that is continuous with the first cutting edge 51 is referred to as a first rake surface 21a, and the rake surface that is continuous with the second cutting edge 52 is referred to as a second rake surface 21b. The first rake surface 21a is continuous with the first cutting edge 51, and is inclined and located closer to the lower surface 3 as the first rake surface 21a separates from the first cutting edge 51 with respect to a horizontal plane including the intersection (first cutting edge 51), namely, a plane which includes the intersection (first cutting edge 51), and is perpendicular to a central axis S of the insert 1. The second rake surface 21b is continuous with the second cutting edge 52, and is inclined and located closer to the lower surface 3 as the second rake surface 21b separates from the second cutting edge 52 with respect to a horizontal plane including the intersection (second cutting edge 52), namely, a plane which includes the intersection (second cutting edge 52), and is perpendicular to the central axis S of the insert 1. This configuration facilitates the cutting edge 5 cut into a workpiece, thereby reducing cutting resistance. Therefore, relative vibration (hereinafter referred to as "chatter vibration") caused between the cutting edge 5 and the surface of the workpiece can be reduced to improve machining accuracy. Here, the central axis S of the insert 1 is the axis extending between the upper surface 2 and the lower surface 3 as shown in FIG. 1, and denotes the axis serving as a rotation axis when the insert 1 is rotated so that the positions of the cutting sections I and I are replaced with each other.

As shown in FIG. 2, the upper surface 2 includes a pair of raised parts 22 and 22 opposed to each other with a perpendicular bisector L of the cutting edge 5 interposed therebetween. As shown in FIGS. 2 and 3, the present embodiment includes raised parts 22a and 22b opposed to each other with the perpendicular bisector L of the first cutting edge 51 interposed therebetween. Owing to this configuration, the chips are deformed and the cross section of the chips is deformed into a concave shape by a height difference in the upper surface 2. Further in the present embodiment, the perpendicular bisector L corresponds to the perpendicular bisector of the first cutting edge 51. Therefore, the cross section of the chips can be deformed at their middle part into the concave shape, and balance in the width direction of the chips can be improved to enhance the chip discharge performance. Accordingly, the chips generated by the first cutting edge 51 are deformed in the concave shape, and therefore become narrower than a width of the first cutting edge 51, namely, a width of a side of the cutting section I. This prevents the chips from damaging the machine surface of the workpiece existing around the chips. Additionally, in a cutting process using the second cutting edge 52, namely, the traversing process, the raised parts 22 have a function of so-called breaker, and the chips can be suitably divided and discharged by appropriately controlling the curl diameter of chips generated. In the present embodiment, each of the raised parts 22a and 22b extends along the second cutting edge 52, with a space interposed between each of the raised parts and the second cutting edge 52 on a side adjacent thereto. The perpendicular bisector L intersects the central axis S in a top view.

As shown in FIG. 3, a top of each of the pair of raised parts 22 and 22 includes at least two protrusions 23 and 23 oriented toward a direction along the perpendicular bisector L in a top view. In the present embodiment, protrusions 231 and 232 extending in the direction along the perpendicular bisector L are disposed on each of the tops of the raised parts 22a and 22b, as shown in FIG. 3.

To be specific, each of the protrusions 23 includes a first protrusion 231 located closest to the perpendicular bisector L, and a second protrusion 232 which is located further away from the perpendicular bisector L than the first protrusion 231, and is located at a higher position than the first protrusion 231. That is, the first protrusion 231 is located closer to the perpendicular bisector L than the second protrusion 232 as shown in FIG. 3, and the second protrusion 232 is located at the higher position than the first protrusion 231. Hereinafter, the phrase "higher position" denotes being located at a higher position in a thickness direction of the insert 1 than a comparison object unless otherwise noted. More specifically, the phrase "higher position" denotes that when the insert 1 is placed on a horizontal plane by using the lower surface 3 as a mounting surface, the second protrusion 232 is located at a higher position on the basis of the first cutting edge 51. When it is difficult to place the insert 1 on the horizontal plane by using the lower surface 3 as the mounting surface, in a state that the insert 1 is attached to the holder 11, the second protrusion 232 may be located at a higher position than the first protrusion 231. Owing to this configuration, the chips can be deformed and hardened by the first protrusion, and the lateral shift of the chip discharge direction can be reduced by the second protrusion 232. Particularly, in the face grooving process, a cutting speed difference occurs between the right end part and the left end part of the first cutting edge 51. This causes a curl diameter difference between the right end part and the left end part of chips generated, and the chips are therefore discharged spirally. In this case, though the chips are discharged while being tilted either leftward or rightward, the first protrusion 231 and the second protrusion 232 of either one of the raised parts 22a and 22b can stably support the chips.

Figure 4A:
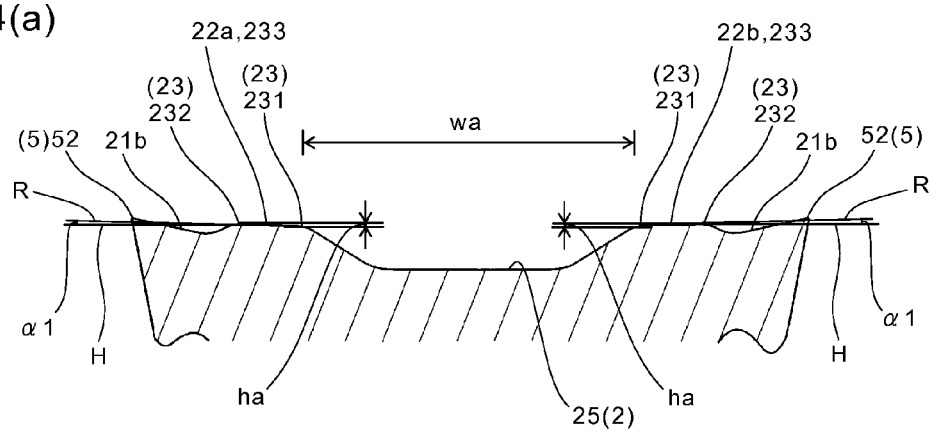
FIG. 4(a) is a sectional view taken along the line A-A in the cutting insert shown in FIG. 3.
Figure 4B:
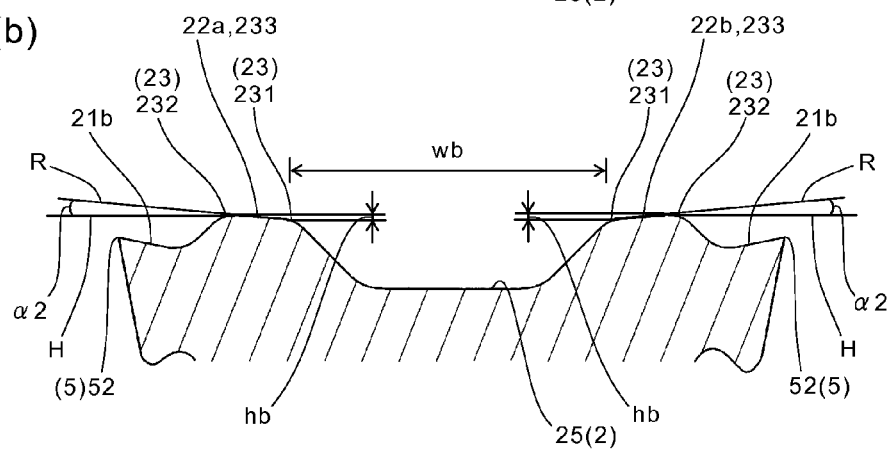
FIG. 4(b) is a sectional view taken along the line B-B in the cutting insert shown in FIG. 3.
Figure 4C:
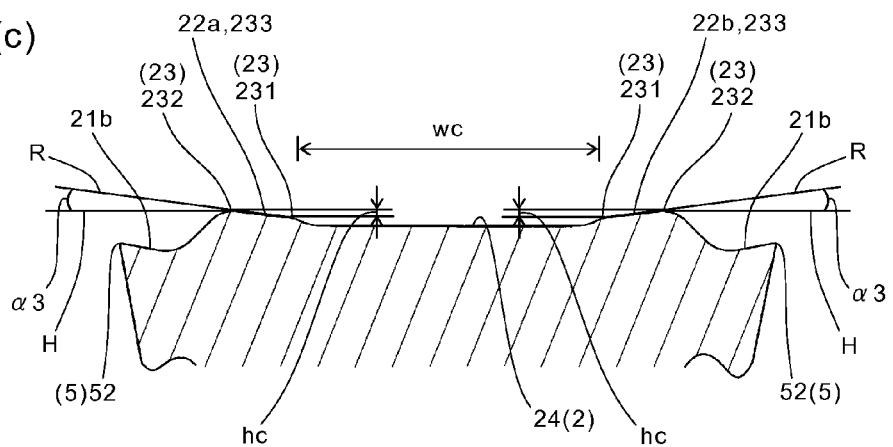
FIG. 4(c) is a sectional view taken along the line C-C in the cutting insert shown in FIG. 3.
Figure 5A:
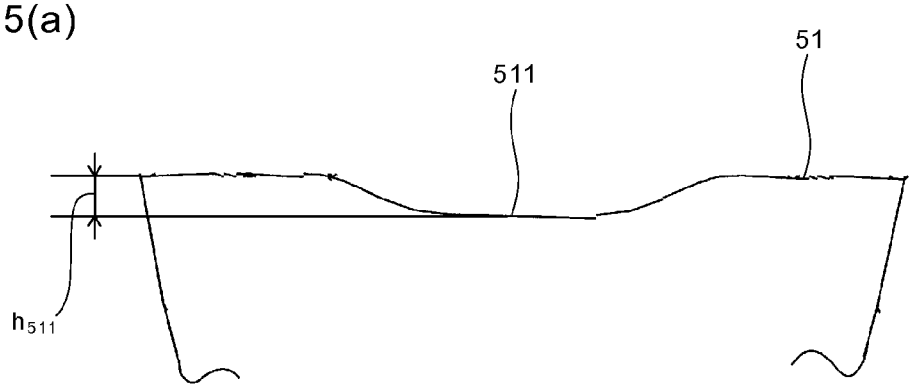
FIG. 5(a) is a partially enlarged front view of the vicinity of a cutting edge of the cutting insert shown in FIG. 1(b)
Figure 5B:
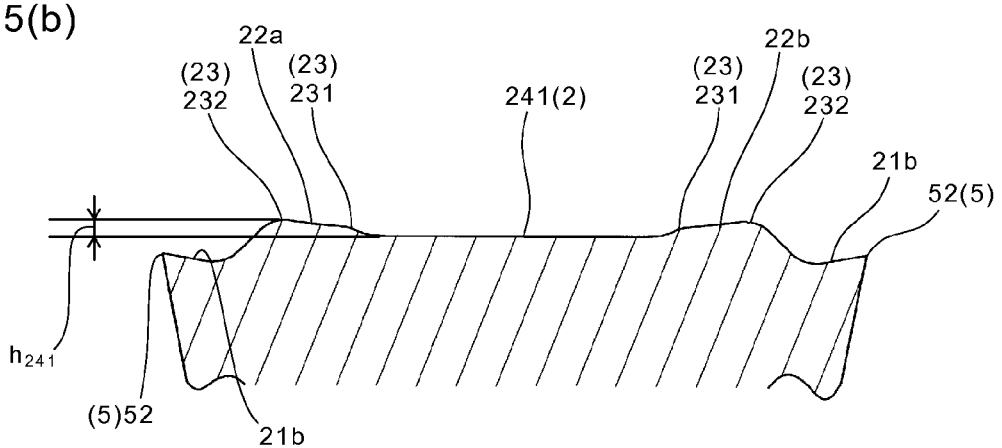
FIG. 5(b) is a sectional view taken along the line C-C in the cutting insert shown in FIG. 3.

A distance between the first protrusion 231 of the raised part 22a and the first protrusion 231 of the raised part 22b is preferably decreased as separating from the first cutting edge 51 in a top view. In the present embodiment, there is an inequality relationship of wa>wb>wc, where wa is a distance between the first protrusions 231 and 231 in FIG. 4(a), wb is a distance between the first protrusions 231 and 231 in FIG. 4(b), and wc is a distance between the first protrusions 231 and 231 in FIG. 4(c). This configuration facilitates the deformation of the chips in the width direction thereof. Consequently, the chips are hardened, thus reducing the lateral shift in the chip discharge direction. FIG. 4(a) shows a cross section extending through the second rake surface 251 in a concave groove 25. FIG. 4(b) shows a cross section extending through a flat portion of a bottom part of the concave groove 25. FIG. 4(c) shows a cross section extending through a middle inclined part 24.

As shown in FIG. 4, in at least one of the pair of raised parts 22, a height difference between the first protrusion 231 and the second protrusion 232 is preferably increased as separating from the first cutting edge 51 in a sectional view which is parallel to the central axis S, and is parallel to the first cutting edge 51. According to the present embodiment, in each of the pair of raised parts 22, the height difference between the first protrusion 231 and the second protrusion 232 is increased as separating from the first cutting edge 51. Specifically, there is an inequality relationship of ha<hb<hc, where ha is a height difference between the first protrusion 231 and the second protrusion 232 in FIG. 4(a), hb is a height difference between the first protrusion 231 and the second protrusion 232 in FIG. 4(b), and hc is a height difference between the first protrusion 231 and the second protrusion 232 in FIG. 4(c). This configuration reduces the disadvantage of being difficult to keep balance due to the fact that the curl diameter difference between the right end part and the left end part of the chips is increased as separating from the first cutting edge 51. It is therefore capable of reducing the lateral shift of the chips in the chip discharge direction. This configuration also satisfactorily facilitates the deformation of the chips in the width direction thereof, and consequently reduces the lateral shift of the chips in the chip discharge direction.

As shown in FIG. 4, in at least one of the pair of raised parts 22, an angle formed by a straight line R connecting a top of the first protrusion 231 and a top of the second protrusion 232, and a horizontal plane H corresponding to a perpendicular line of the central axis S is preferably set at 1° to 10° in the sectional view which is parallel to the central axis S, and is parallel to the first cutting edge 51. This achieves a reduction in cutting resistance while ensuring the strength of the first protrusion 231 and the second protrusion 232. In the vicinity of the first cutting edge 51, the above-mentioned angle may be set at 0° to the first cutting edge 51. For example, α1 is preferably set at 0° 30' to 5°, where α1 is an angle formed by the straight line R that connects the top of the first protrusion 231 and the top of the second protrusion 232, and the horizontal plane H in FIG. 4(a). Similarly, α2 is preferably set at 3° to 7°, and α3 is preferably set at 5° to 8°, where α2 is an angle formed by the straight line R that connects the top of the first protrusion 231 and the top of the second protrusion 232, and the horizontal plane H in FIG. 4(b), and α3 is an angle formed by the straight line R that connects the top of the first protrusion 231 and the top of the second protrusion 232, and the horizontal plane H in FIG. 4(c). These angles α1 to α3 preferably have an inequality relationship of α1<α2<α3. These angles α1 to α3 are not limited to their respective numeric value ranges as described above.

From the viewpoint of stably supporting the chips in the discharge process thereof, the first protrusion 231 and the second protrusion 232 are connected to each other with a surface interposed therebetween. This surface may be a flat surface or curved surface, and no special limitation is imposed thereon except that this surface is located at a lower position than the straight line R. Hereinafter, the phrase "lower position" denotes being located at a lower position in the thickness direction of the insert 1 than a comparison object unless otherwise noted. More specifically, this is prescribed similarly to the foregoing "higher position." In the present embodiment, from the viewpoint of facilitating the deformation of the chips in the width direction thereof, the first protrusion 231 and the second protrusion 232 are continuous with each other with a curved surface 233 interposed therebetween as shown in FIG. 4. The curved surface 233 is bent toward a side closer to the lower surface 3.

In the present embodiment, each of the pair of raised parts 22a and 22b is disposed continuously with the first cutting edge 51, thereby making it easier for the chips to be more stably discharged from an edge.

Figure 6:
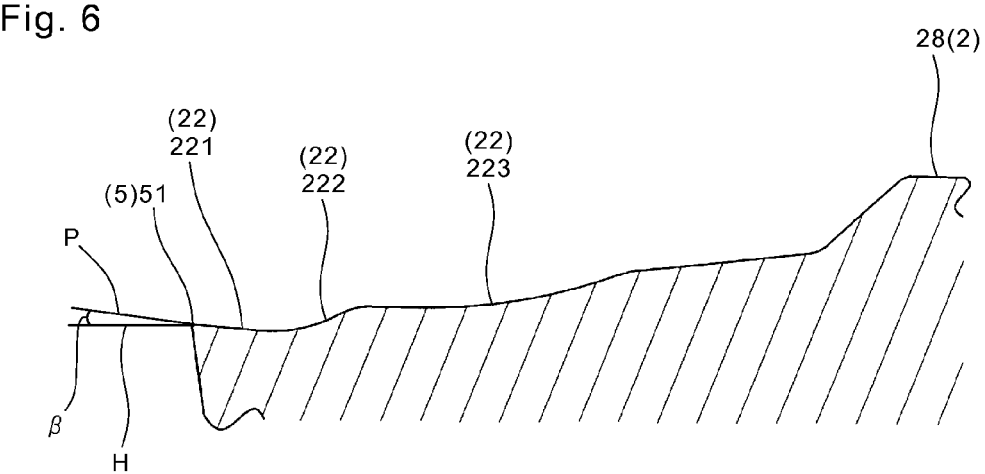
FIG. 6 is a sectional view taken along the line D-D in the cutting insert shown in FIG. 3.

In the present embodiment, each of the raised parts 22 includes a first rake part 221 located closer to the front end part thereof, as shown in FIG. 6. The first rake part 221 is disposed to satisfy β≥0°, where a horizontal plane H is a horizontal plane including at least a part of the intersection (first cutting edge 51), a rake angle β is an angle formed by a virtual extension line P of the first rake part 221 and the horizontal plane H, a rake angle is positive when the virtual extension line P is located above the horizontal plane H, and a rake angle is negative when the virtual extension line P is located below the horizontal plane H in a sectional view which is parallel to the central axis S, and is perpendicular to the first cutting edge 51. In other words, the first rake part 221 is inclined downward at an inclination angle β as the first rake part 221 separates from the first cutting edge 51 on the basis of the horizontal plane H. It should be noted that FIG. 6 is the sectional view, and therefore, the horizontal plane H is expressed by a straight line. The horizontal plane H corresponds to a plane perpendicular to the central axis S. The positive rake angle β facilitates the first cutting edge 51 cut into the workpiece, thereby reducing the cutting resistance. Accordingly, the chatter vibration can be reduced to improve the machining accuracy. The rake angle β is preferably set at 0 to 1° from the viewpoint of the cutting edge strength.

As shown in FIG. 6, each of the raised parts 22 includes a first inclined surface 222 which is continuous with the first rake part 221, and is inclined and separated from the lower surface 3 as the raised part 22 separates from the first cutting edge 51 in a sectional view which is parallel to the central axis S, and is perpendicular to the first cutting edge 51. The first inclined surface 222 functions as a breaker in a cutting process using a region that extends from an end portion to a middle portion of the first cutting edge 51 (hereinafter referred to as a "shoulder grooving process") in order to widen a groove width of a machined groove. Hence, the chips can easily be curled and finely divided, thus facilitating a smooth discharge of the chips.

As shown in FIG. 6, each of the raised parts 22 includes a second inclined surface 223 which is continuous with the first inclined surface 222, and is inclined and separated from the lower surface 3 as the raised part 22 separates from the first cutting edge 51, at a smaller angle than the first inclined surface 222, namely, with a smaller and more gentle amount of change in the distance from the lower surface 3 than the first inclined surface 222, in a sectional view which is parallel to the central axis S, and is perpendicular to the first cutting edge 51. This facilitates a more stable rearward discharge of the chips. Hereinafter, the term "rearward" denotes a direction from the first cutting edge 51 to the clamp surface 28 unless otherwise noted. In the present embodiment, as shown in FIG. 6, the second inclined surface 223 is a concave-like curved surface, and is preferably made of a plane whose radius of curvature is, for example, 2 mm to 8 mm.

As shown in FIGS. 2 and 3, the upper surface 2 includes a middle inclined part 24 which is extended between the pair of raised parts 22a and 22b, and is inclined and located at a higher position as the middle inclined part 24 separates from the first cutting edge 51. As shown in FIG. 4(c), the middle inclined part 24 is located at a lower position than the first protrusion 231. This configuration allows the middle part of the chips to be supported from below by the middle inclined part 24, thereby facilitating a more stable discharge of the chips.

A distance between the middle inclined part 24 and the first cutting edge 51 may be suitably set according to the size of the insert 1 and a cutting condition, and no special limitation is imposed thereon. For example, in the present embodiment, as shown in FIG. 3, the middle inclined part 24 is located at the middle part of the upper surface 2 from the viewpoint of making it easier to fix the curl diameter of the chips.

In the present embodiment, an end portion 241 of the middle inclined part 24 located further away from the first cutting edge 51, in other words, the high end portion 241 of the middle inclined part 24 is located correspondingly to the second inclined surface 223. Specifically, as shown in FIG. 3, a part of the second inclined surface 223 is located on a straight line N in a top view, where the straight line N is a straight line which passes through the middle inclined part 24, and is parallel to the first cutting edge 51. This configuration allows the middle part of the chips to be curled by the concave groove 25, and also allows the end portions of the chips to be curled by the second inclined surface 223, thereby making it easier to fix the curl diameter of the chips. Hereinafter, the phrase "located correspondingly" denotes that a part of one region is located on a straight line passing through the other region unless otherwise noted.

A height of the middle inclined part 24 is required to be lower than the first protrusion 231, and the height may be suitably set according to the size of the insert 1 and the cutting condition. For example, in the present embodiment, a height difference between the second protrusion 232 and the end portion 241 on the high side of the middle inclined part 24 is preferably smaller than a depth of a concave part 511 of the first cutting edge 51 in a sectional view which extends through the high end portion 241 of the middle inclined part 24, is parallel to the first cutting edge 51, and is oriented in a vertical direction. In other words, the height difference between the second protrusion 232 and the end portion 241 of the middle inclined part 24 located further away from the first cutting edge 51 is preferably smaller than the depth of the concave part 511 in the sectional view which is parallel to the central axis S, and is parallel to the first cutting edge 51. Specifically, this can be expressed as $h_{241} < h_{511}$, where $h_{511}$ is a depth of the concave part 511 of the first cutting edge 51 in FIG. 5(a), and $h_{241}$ is a height difference between the second protrusion 232 and the high end portion 241 of the middle inclined part 24. This configuration allows the chips to more surely contact with the middle inclined part 24, thereby making it easier to fix the curl diameter of the chips. Hereinafter, the term "depth" denotes a height difference between a point having a minimum distance from the lower surface 3 and a point having a maximum distance from the lower surface 3 in a certain region unless otherwise noted.

As shown in FIGS. 2 and 3, the upper surface 2 includes the concave groove 25 between the pair of raised parts 22a and 22b. This configuration facilitates the deformation of the chips, and also makes it easier to fix a travel direction of the chips to the rearward. In the present embodiment, the concave groove 25 is disposed to lie on the perpendicular bisector L so as to have symmetry with the perpendicular bisector L as an axis of symmetry. The concave part 511 of the first cutting edge 51 and the concave groove 25 are continuous with each other from the viewpoint of a stable discharge of the chips.

Figure 7:
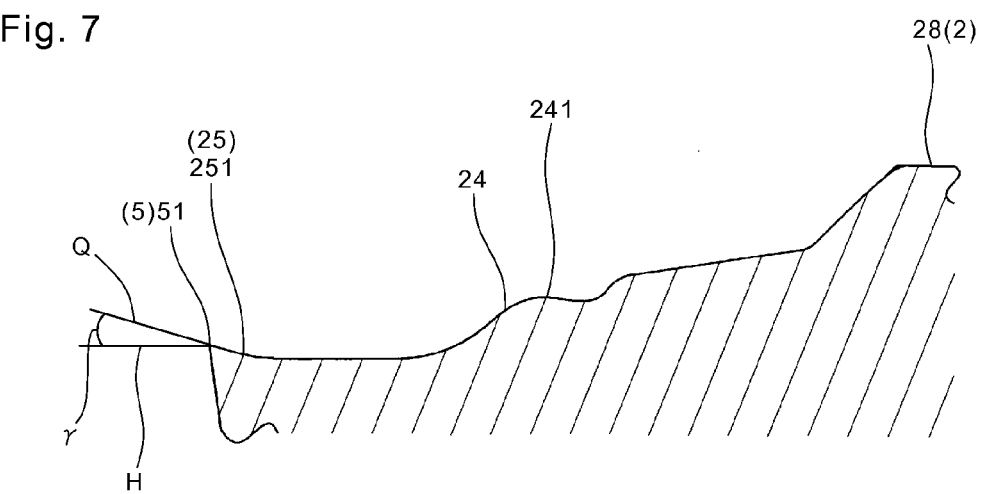
FIG. 7 is a sectional view taken along the line E-E in the cutting insert shown in FIG. 3.
Figure 8:
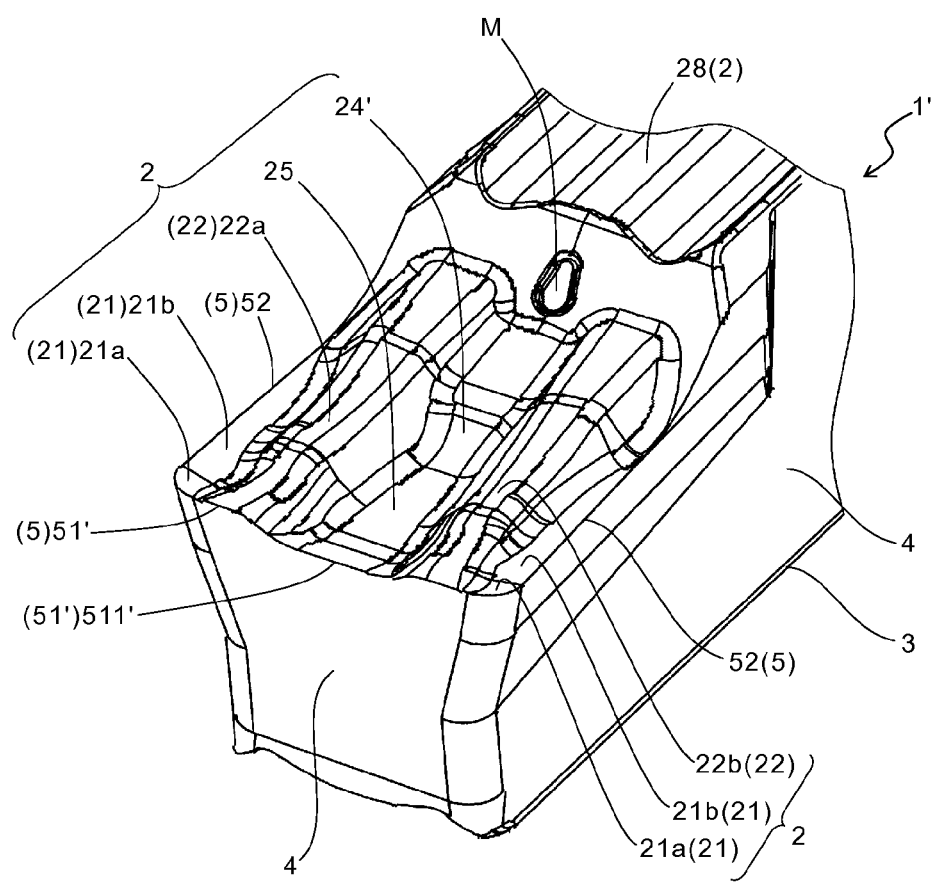
FIG. 8 is a perspective view showing, in partially enlarged scale, a part of a cutting section I and a part of a clamp section II of a cutting insert according to a second embodiment of the present invention.

The concave groove 25 has a second rake part 251 at an end portion thereof closer to the concave part 511. Specifically, as shown in FIG. 7, it is required to satisfy γ>0°, wherein a rake angle γ is an angle formed by a virtual extension line Q of the second rake part 251 and the horizontal plane H. In other words, the second rake part 251 is inclined downward at an inclination angle γ as the second rake part 251 separates from the first cutting edge 51 on the basis of the horizontal plane H corresponding to a plane perpendicular to the central axis S, in a sectional view which is parallel to the central axis S, and is perpendicular to the first cutting edge 51. A positive rake angle γ facilitates the first cutting edge 51 cut into the workpiece, thus reducing the cutting resistance. Consequently, the chatter vibration can be reduced to improve the machining accuracy. The rake angle γ is preferably set at, for example, 10° to 20°.

An inequality relationship of the rake angle β and the rake angle γ is β<γ. Owing to this configuration, a thickness of the middle part of the chips that graze the second rake part 251 is smaller than a thickness of the end portions of the chips that graze the first rake part 221 in a sectional view of the chips. This facilitates bending of the middle part of the chips, thereby further facilitating the deformation of the chips in the width direction thereof.

As shown in FIG. 3, each of the end portions of the concave groove 25 closer to the pair of raised parts 22 and 22 includes a protruded portion 252 that protrudes toward form a pair raised part 22 in a top view. This configuration allows a force to be exerted in the width direction of the chips even in the middle part of the chips, thereby more satisfactorily facilitating the deformation of the chips in the width direction thereof. Additionally, for example, when used for the shoulder grooving process, the protruded portions 252 perform the role of a breaker, and consequently the chips are curled and divided, thereby improving the chip discharge performance. The protruded portions 252 are preferably located correspondingly to the middle inclined part 24. Specifically, as shown in FIG. 3, a part of each of the protruded portions 252 is located on the straight line N. This configuration allows for the deformation of the chips in the width direction thereof at substantially the same time as the chips are curled by the middle inclined part 24. Consequently, the chip discharge performance can be further improved.

As shown in FIG. 3, each of the raised parts 22 includes a concave part 26 and a protruded part 27. The concave part 26 is located on a side closer to the first cutting edge 51 in an outer wall on a side closer to the second cutting edge 52, and is inwardly concaved with respect to the second cutting edge 52 in a top view. The protruded part 27 is continuous with the concave part 26 on a side further away from the first cutting edge 51 than the concave part 26, and is protruded outwardly with respect to the second cutting edge 52 in the top view.

Further, at a position corresponding to the concave part 26 of the upper surface 2, a rake part (first rake surface 21a) with respect to the first cutting edge 51 and a rake part (second rake surface 21b) with respect to the second cutting edge 52 intersect each other to form a concave-like part (not shown). For example, in the traversing process, this configuration allows the above concave-like part and the concave part 26 to generate finely divided chips having a relatively small curl diameter, thus improving the chip discharge performance. Additionally, in the shoulder grooving process, this configuration allows the chips to be curled and divided by the protruded parts 27, thus allowing the chips to be discharged satisfactorily. Hereinafter, the term "inward" denotes a direction toward the middle part of the upper surface 2 on the basis of the cutting edge 5, and the term "outward" denotes the opposite direction of inward in a top view unless otherwise noted.

Second Embodiment

An insert according to a second embodiment of the present invention is described in details below with reference to FIGS. 8 to 11. In FIGS. 8 to 11, elements similar to those in FIGS. 1 to 7 are identified by the same reference numerals, and descriptions thereof are omitted here.

In a top view, an end portion 241' located further away from a first cutting edge 51' in a middle inclined part 24', in other words, the end portion 241' on the high side of the middle inclined part 24' is preferably located on the same straight line as an end portion 223'u on a high side of a second inclined surface 223', or is preferably located more rearward than the end portion 223' on the high side of the second inclined surface 223'.

Figure 9:
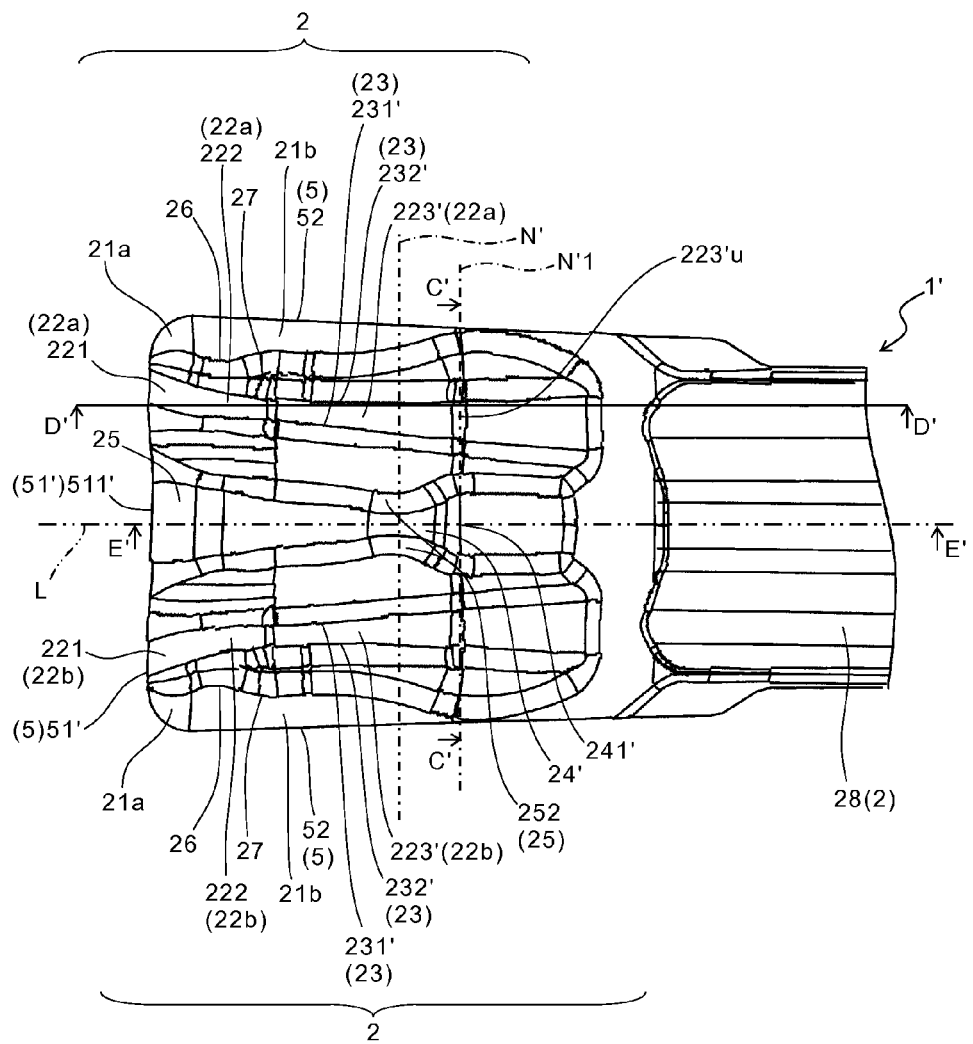
FIG. 9 is a plan view (top view) of the cutting insert shown in FIG. 8.

In the present embodiment, as shown in FIG. 9, the end portion 241' on the high side of the middle inclined part 24' and the end portion 223'u on the high side of the second inclined surface 223' are located on the same straight line. That is, the end portion 241' on the high side of the middle inclined part 24' and the end portion 223'u on the high side of the second inclined surface 223' are located on the same straight line N'1, where the straight line N'1 is a straight line that is obtained by allowing a straight line N' passing through the middle inclined part 24' and being parallel to a first cutting edge 51' to move in parallel to a direction to separate from the first cutting edge 51'.

Figure 10:
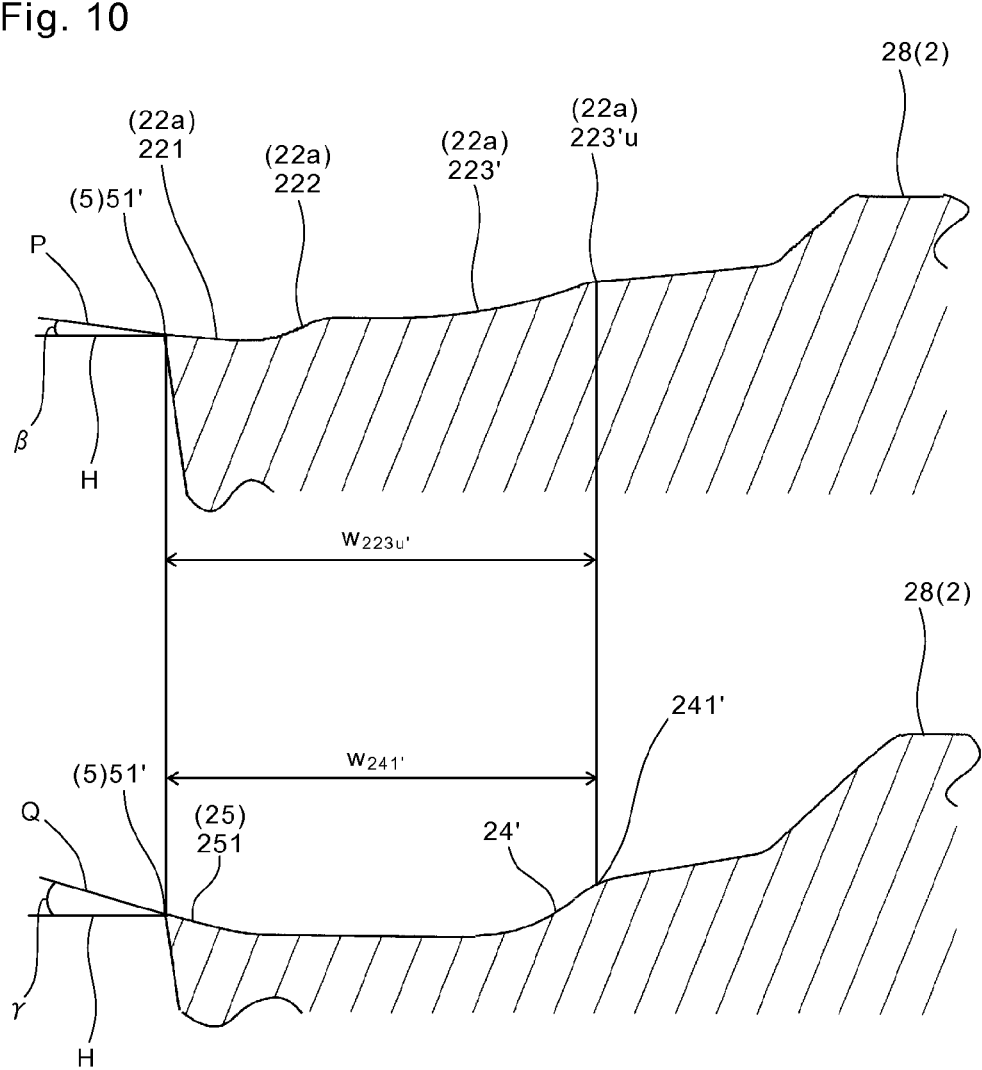
FIG. 10 shows sectional view taken along the line D'-D' in the cutting insert shown in FIG. 9 in an upper portion of the figure, and along the line E'-E' in the cutting insert shown in FIG. 9 in a lower portion of the figure.
Figure 11A:
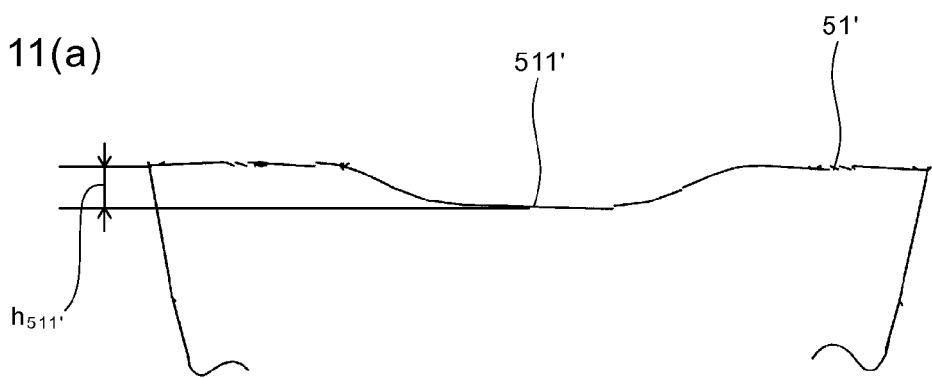
FIG. 11(a) is a partially enlarged front view of the vicinity of a cutting edge of the cutting insert shown in FIG. 8.
Figure 11B:
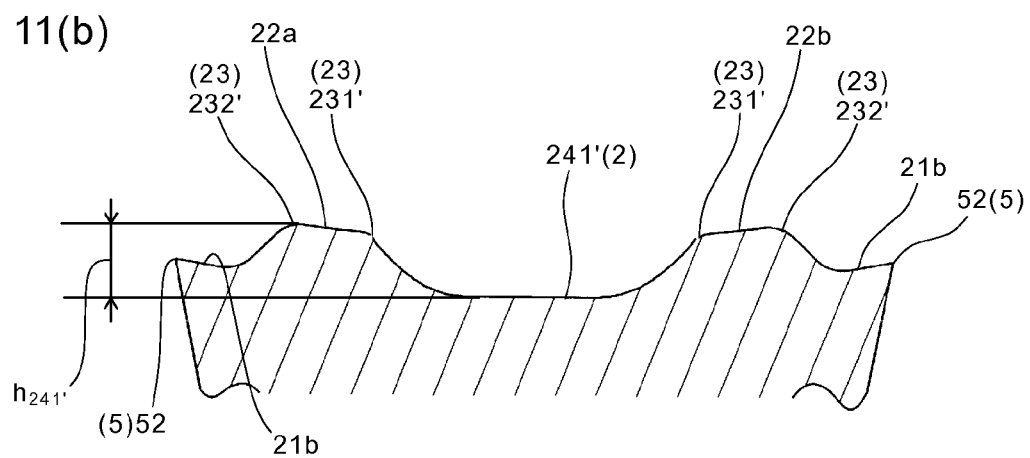
FIG. 11(b) is a sectional view taken along the line C'-C' in the cutting insert shown in FIG. 9.

To be specific, in the present embodiment, $w_{241'}=w_{223'u}$, where $w_{241'}$ is a distance from the high end portion 241' of the middle inclined part 24' to the first cutting edge 51', and $w_{223'u'}$ is a distance from the high end portion 223' of the second inclined surface 223' in a sectional view which is parallel to the central axis S, and is perpendicular to the first cutting edge 51' as shown in FIG. 10. For example, under a high load cutting condition as in the case of high feed rates, only the middle part of the chips is supported by the middle inclined part 24', thereby eliminating the chips brought into contact with the second inclined surface 223'. This makes it difficult to fix the chip curl diameter, thus making it difficult to fix the chip discharge direction. This situation can be overcome with the present embodiment. That is, the position of the highest location (223'u) of the second inclined surface 223' and the position of the highest location (241') of the middle inclined part 24' coincide with each other. This allows the chips to be supported by the middle inclined part 24' and the second inclined surface 223', making it easier to fix the chip curl diameter, and consequently stabilizing the chip discharge direction.

The height of the middle inclined part 24' is required to be lower than a first protrusion 231', and may be suitably set according to the size of the insert 1' and the cutting condition. For example, in the present embodiment, a height difference between a second protrusion 232' and the end portion 241' on the high side of the middle inclined part 24' is preferably larger than a depth of a concave part 511' of the first cutting edge 51' in a sectional view which extends through the high end portion 241' of the middle inclined part 24', is parallel to the first cutting edge 51', and is in a vertical direction. In other words, the height difference between the second protrusion 232' and the end portion 241' of the middle inclined part 24' located on a side further away from the first cutting edge 51' is preferably larger than the depth of the concave part 511' in a sectional view which is parallel to the central axis S, and is parallel to the first cutting edge 51'. Specifically, $h_{241'} > h_{511'}$, where $h_{511'}$ is a depth of the concave part 511' of the first cutting edge 51' in FIG. 11(a), and $h_{241'}$ is a height difference between the second protrusion 232' and the high end portion 241' of the middle inclined part 24' in FIG. 11(b). This configuration allows the chips to be supported by the middle inclined part 24' and the second inclined surface 223' under the foregoing high load condition. This makes it easier to fix the chip curl diameter, thereby stabilizing the chip discharge direction.

Other configurations are similar to those of the insert 1 of the foregoing first embodiment, and therefore descriptions thereof are omitted here.

<Cutting Tool>

The inserts 1 and 1' are usable for all of the internal grooving process, the external grooving process, the cut-off process and the face grooving process.

Figure 12:
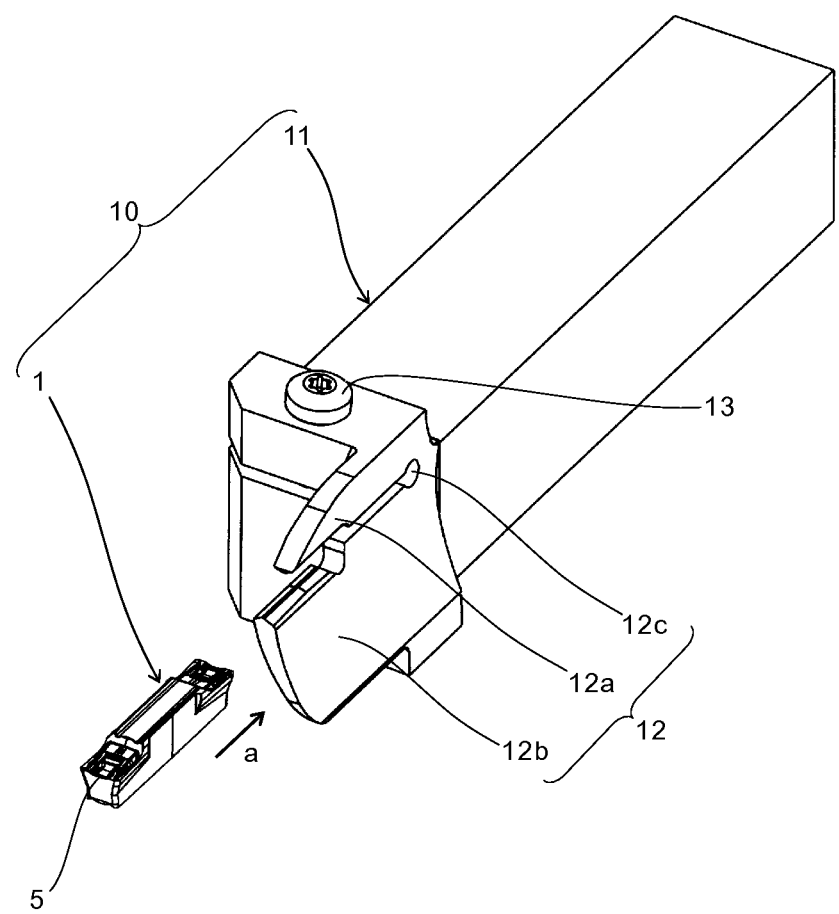
FIG. 12 is a perspective view showing a cutting tool according to an embodiment of the present invention.

As a cutting tool according to the present invention, the cutting tool 10 having the insert 1 attached thereto is described by illustrating the case of using the insert 1 for the face grooving process with reference to FIG. 12.

As shown in FIG. 12, the cutting tool 10 of the present embodiment includes the insert 1 and a prism-like holder 11 having a holding part 12 configured to hold the insert 1 at a front end of the holder 11. The insert 1 is attached to the front end part of the holder 11 so that the insert 1 is held in a state that the cutting edges 5 protrude beyond the front end of the holding part 12.

The fixing of the insert 1 to the holder 11 is carried out, for example, in the following manner. As shown in FIG. 12, firstly, the insert 1 is inserted between an upper jaw 12a and a lower jaw 12b of the holding part 12 by moving the insert 1 in the direction of arrow a. Then, a screw 13 is fastened thereto, and the upper jaw 12a is elastically deformed and pushed down. Consequently, the insert 1 is pressed against the lower jaw 12b, and is held and fixed between the upper jaw 12 and the lower jaw 12b.

In the present embodiment, a slit 12c is formed in the holder 11, and therefore the slit 12c makes it easier for the upper jaw 12a to be more elastically deformed, and therefore, the front end of the upper jaw 12a can be depressed more easily.

Further, because the cutting tool 10 of the present embodiment is used for the face grooving process, as shown in FIG. 12, the lower jaw 12b is curved along an outer periphery and an inner periphery of a machined groove in a top end view of the lower jaw 12b. When the lower jaw 12b is formed in a straight-like line in a front end view, an annular groove is formed in the face grooving process. Therefore, depending on the size of a machining diameter, the lower jaw 12b is contacted against the machined groove during a cutting process. Hence, the machining diameter is determined beforehand, and the lower jaw 12b is curved along the outer periphery and the inner periphery of the machined groove.

Although in the present embodiment, the holder 11 and the holding part 12 are formed integrally from the viewpoint of improving durability, the holding part 12 and the holder 11 may be attachably and detachably formed. Although the present embodiment employs a method of constraining the insert 1 by holding down the insert 1 from above while adjusting a constraining force via the screw 13 disposed at the front end part of the holder 11, the method is not limited thereto.

<Method of Manufacturing Machined Product>

Next, a method of manufacturing a machined product according to an embodiment of the present invention is described below with reference to FIG. 13. In the present embodiment, the description is made by taking the foregoing cutting tool 10 as an example.

The present embodiment is the face grooving process. Therefore, as shown in FIG. 13(d), an annular groove 101 is formed on an end surface of a workpiece 100. A part of the workpiece 100 shown in FIGS. 13(a) to 13(c) is illustrated in a sectional view.

The method of manufacturing the machined product according to the present embodiment includes the following steps (i) to (iv).

Figure 13A:
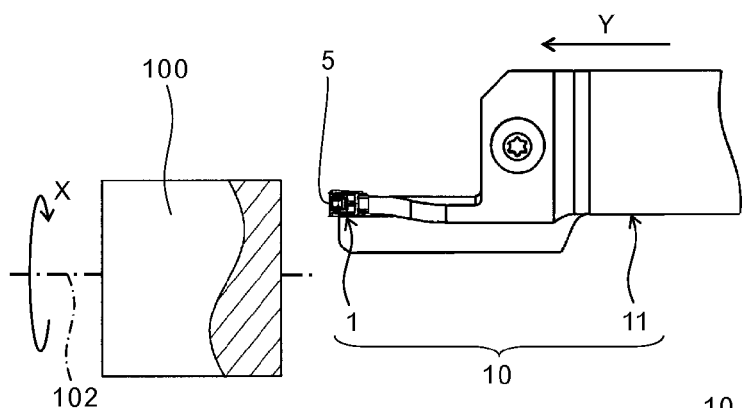
FIGS. 13(a) to 13(d) are schematic diagrams showing a method of manufacturing a machined product according to an embodiment of the present invention.
Figure 13B:
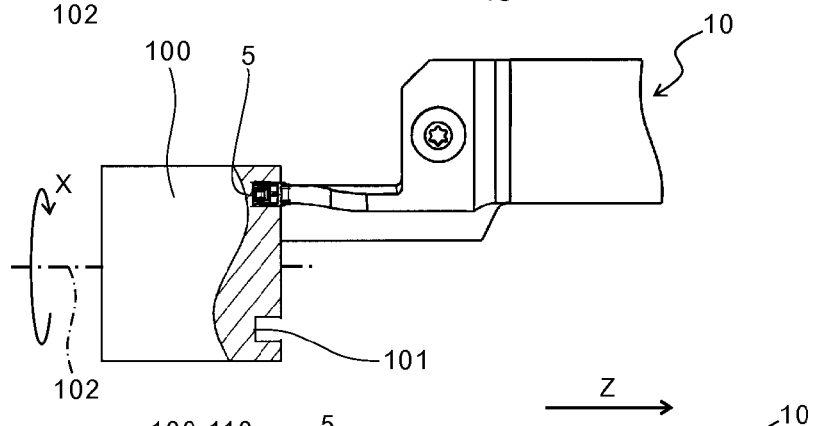
Figure 13C:
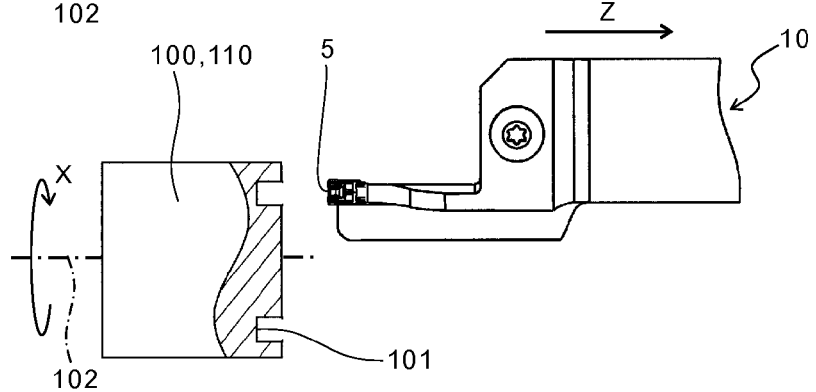
Figure 13D:
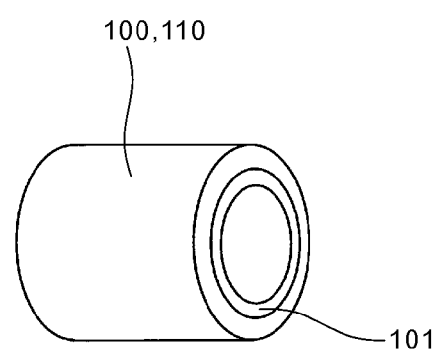

(i) rotating the substantially cylinder-like workpiece 100 around a rotation axis 102 in a direction of an arrow X, as shown in FIG. 13(a);

(ii) bringing the cutting tool 10 near the workpiece 100 being rotated by moving the cutting tool 10 in a direction of an arrow Y;

(iii) cutting the workpiece 100 by bringing the cutting edge 5 of the cutting tool 10 into contact against the workpiece 100 being rotated, as shown in FIG. 13(b); and (iv) separating the cutting tool 10 from the workpiece 100 after being cut by moving the cutting tool 10 in a direction of an arrow Z, as shown in FIG. 13(c).

A machined product 110 as shown in FIG. 13(d) is manufactured through the foregoing manufacturing steps.

In the step (i), the workpiece 100 and the cutting tool 10 may be brought near each other. For example, the workpiece 100 may be brought near the cutting tool 10. Similarly, in the step (iv), the workpiece 100 and the cutting tool 10 may be separated from each other. For example, the workpiece 100 may be separated from the cutting tool 10. In the step (iii), during the grooving process, a process for forming a groove, and the traversing process are carried out.

When the cutting process is continued, it is required to repeat the step of bringing the cutting edge 5 of the cutting tool 10 into contact against different locations of the workpiece 100, while keeping the workpiece 100 rotating.

Examples of the material of the workpiece 100 are carbon steel, alloy steel, stainless steel, cast iron and non-iron metal.

Although the present embodiment has been described using the left hand type holder 11, a right hand type holder 11 may be used. Although the present embodiment has been described illustrating the case of using the cutting tool 10 having the insert 1 attached thereto, a similar operation effect can be produced by using the cutting tool having the insert 1' attached thereto, instead of the insert 1.

It is to be understood that the present invention is not limited to the foregoing embodiments, and various changes and modifications can be made therein without departing from the spirit or scope of the present invention.

For example, the pair of raised parts 22 and 22 have the same configuration in the foregoing embodiment. Alternatively, the pair of raised parts 22 and 22 may have different configurations.

The invention claimed is:

1. A cutting insert, comprising:
an upper surface;
a side surface;
a first cutting edge located at an intersection of the upper surface and the side surface, and
a second cutting edge which is located at an intersection of the upper surface and the side surface, and intersects the first cutting edge, wherein
the upper surface comprises a pair of raised parts located opposite to each other with a perpendicular bisector of the first cutting edge interposed therebetween,
a top of each of the pair of raised parts comprises
a first protrusion extending in a direction along the perpendicular bisector,
a second protrusion extending in the direction along the perpendicular bisector, located on a side further away from the perpendicular bisector than the first protrusion, and located at a higher position than the first protrusion, and
a concave curved surface extending in the direction along the perpendicular bisector and located between the first protrusion and the second protrusion, and
at least one of the pair of raised parts extends along the second cutting edge with a space interposed therebetween.

2. The cutting insert according to claim 1, wherein a distance between the first protrusions of the pair of raised parts is decreased as separating from the first cutting edge in a top view.

3. The cutting insert according to claim 1,
further comprising a lower surface,
wherein, in at least one of the pair of raised parts, a difference between a height of the first protrusion and a height of the second protrusion is increased as separating from the first cutting edge, in a sectional view which is parallel to a central axis extending between the upper surface and the lower surface and is parallel to the first cutting edge.

4. The cutting insert according to claim 1,
further comprising a lower surface,
wherein, in at least one of the pair of raised parts, an angle formed by a straight line connecting the top of the first protrusion and the top of the second protrusion and a perpendicular line of a central axis extending between the upper surface and the lower surface is 1 to 10*, in a sectional view which is parallel to the central axis and is parallel to the first cutting edge.

5. The cutting insert according to claim 1, wherein
the upper surface further comprises
a middle inclined part between the pair of raised parts which is inclined and located at a higher position as the middle inclined part separates from the first cutting edge, and
a concave groove which is located between the pair of raised parts and is located between the first cutting edge and the middle inclined part.

6. The cutting insert according to claim 5, wherein
the first cutting edge comprises a concave part inclined and located at a lower position as going toward a middle part of the first cutting edge in a side view, and
the concave groove is continuous with the concave part of the first cutting edge.

7. The cutting insert according to claim 5,
further comprising a lower surface,
wherein
the upper surface further comprises
a first rake part which is located between the first cutting edge and at least one of the pair of raised parts, and is inclined downward at an inclination angle β as the first rake part separates from the first cutting edge on a basis of a plane perpendicular to a central axis extending between the upper surface and the lower surface, and
a second rake part which is located at an end portion of the concave groove closer to the first cutting edge, and is inclined downward at an inclination angle γ as the second rake part separates from the first cutting edge on a basis of the plane of the central axis, and
the inclination angle β is smaller than the inclination angle γ.

8. A cutting tool, comprising:
a cutting insert according to claim 1; and
a holder configured to attach the cutting insert to a front end part thereof.

9. A method of manufacturing a machined product, comprising:
rotating a workpiece;
allowing the workpiece being rotated and the first cutting edge of the cutting tool according to claim 8 to be contacted with each other; and
separating the cutting tool and the workpiece from each other.

10. A cutting insert, comprising:
an upper surface;
a side surface; and
a first cutting edge located at an intersection of the upper surface and the side surface, wherein
the upper surface comprises a pair of raised parts located opposite to each other with a perpendicular bisector of the first cutting edge interposed therebetween,
a top of each of the pair of raised parts comprises
a first protrusion extending in a direction along the perpendicular bisector,
a second protrusion extending in the direction along the perpendicular bisector, located on a side further away from the perpendicular bisector than the first protrusion, and located at a higher position than the first protrusion, and
a concave curved surface extending in the direction along the perpendicular bisector and located between the first protrusion and the second protrusion, and
each of the pair of raised parts is continuous with the first cutting edge.

11. A cutting insert, comprising:
an upper surface;
a side surface; and
a first cutting edge located at an intersection of the upper surface and the side surface, wherein
the upper surface comprises
a pair of raised parts located opposite to each other with a perpendicular bisector of the first cutting edge interposed therebetween, and
a middle inclined part between the pair of raised parts which is inclined and located at a higher position as the middle inclined part separates from the first cutting edge,
a top of each of the pair of raised parts comprises
a first protrusion extending in a direction along the perpendicular bisector, and a second protrusion extending in the direction along the perpendicular bisector, located on a side further away from the perpendicular bisector than the first protrusion, and located at a higher position than the first protrusion, the middle inclined part is located at a lower position than the first protrusion, at least one of the pair of raised parts further comprises an inclined surface inclined and located at a higher position as the inclined surface separates from the first cutting edge, an end portion of the middle inclined part located further away from the first cutting edge is located on an identical straight line together with an end portion of the inclined surface located on a side further away from the first cutting edge, or is located further rearward than the end portion of the inclined surface, in a top view, and the inclined surface comprises
  a first inclined surface located closer to the first cutting edge, and
  a second inclined surface which is located further rearward than the first inclined surface and is inclined at a smaller angle than the first inclined surface.

12. The cutting insert according to claim 11, further comprising a lower surface, wherein the first cutting edge comprises a concave part inclined and located at a lower position as going toward a middle part of the first cutting edge in a side view, and a difference in height between the second protrusion and an end portion of the middle inclined part located further away from the first cutting edge is larger than a depth of the concave part, in a sectional view which is parallel to a central axis extending between the upper surface and the lower surface and is parallel to the first cutting edge.

13. The cutting insert according to claim 11, wherein the second inclined surface is continuous with the first inclined surface and is a concave-like curved surface.

* * * * *